United States Patent [19]
Maloberti et al.

[11] Patent Number: 5,380,129
[45] Date of Patent: Jan. 10, 1995

[54] METHOD FOR LAYING TUBULAR CONDUITS

[75] Inventors: René Maloberti, Champigny; Alain Coutarel, Paris, both of France; Philippe Espinasse, Houston, Tex.

[73] Assignee: Coflexip, France

[21] Appl. No.: 927,294

[22] PCT Filed: Apr. 2, 1991

[86] PCT No.: PCT/FR91/00261
§ 371 Date: Mar. 24, 1993
§ 102(e) Date: Mar. 24, 1993

[87] PCT Pub. No.: WO91/15695
PCT Pub. Date: Oct. 17, 1991

[30] Foreign Application Priority Data
Mar. 30, 1990 [FR] France .................. 90 04099

[51] Int. Cl.⁶ .............................................. F16L 1/16
[52] U.S. Cl. .................... 405/166; 405/158; 405/168.1
[58] Field of Search .............. 405/158, 168.1, 168.4, 405/169, 170, 166

[56] References Cited

U.S. PATENT DOCUMENTS
4,065,822 1/1978 Wilbourn .
4,573,425 3/1986 Pomonik et al. .

FOREIGN PATENT DOCUMENTS
2271482 12/1975 France .
1204715 9/1970 United Kingdom .
WO91/15695 10/1991 WIPO .

*Primary Examiner*—David H. Corbin
*Attorney, Agent, or Firm*—Hoffman, Wasson & Gitler

[57] ABSTRACT

A method for laying a pipeline formed of joined rigid and flexible tubular conduits on an underwater surface, particularly an ocean bed, by using a floating support. The method includes the steps of: loading onto the floating support a length of flexible tubular conduit; laying from the support a length of rigid tubular conduit; connecting the ends of the two conduits together; lowering the conduits; and halting the lowering when the rigid conduit hits bottom, while the other end of the flexible conduit is still in the floating support.

8 Claims, 7 Drawing Sheets

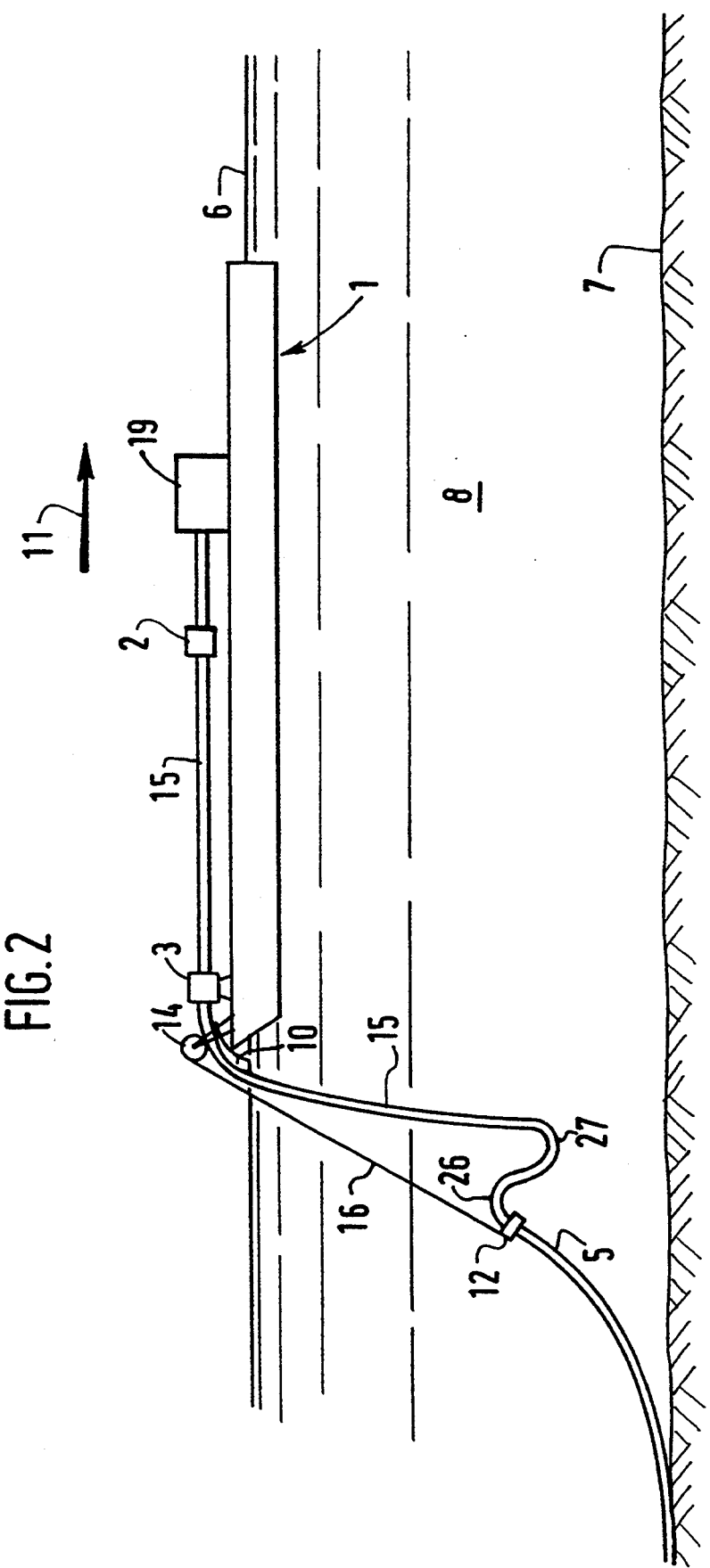

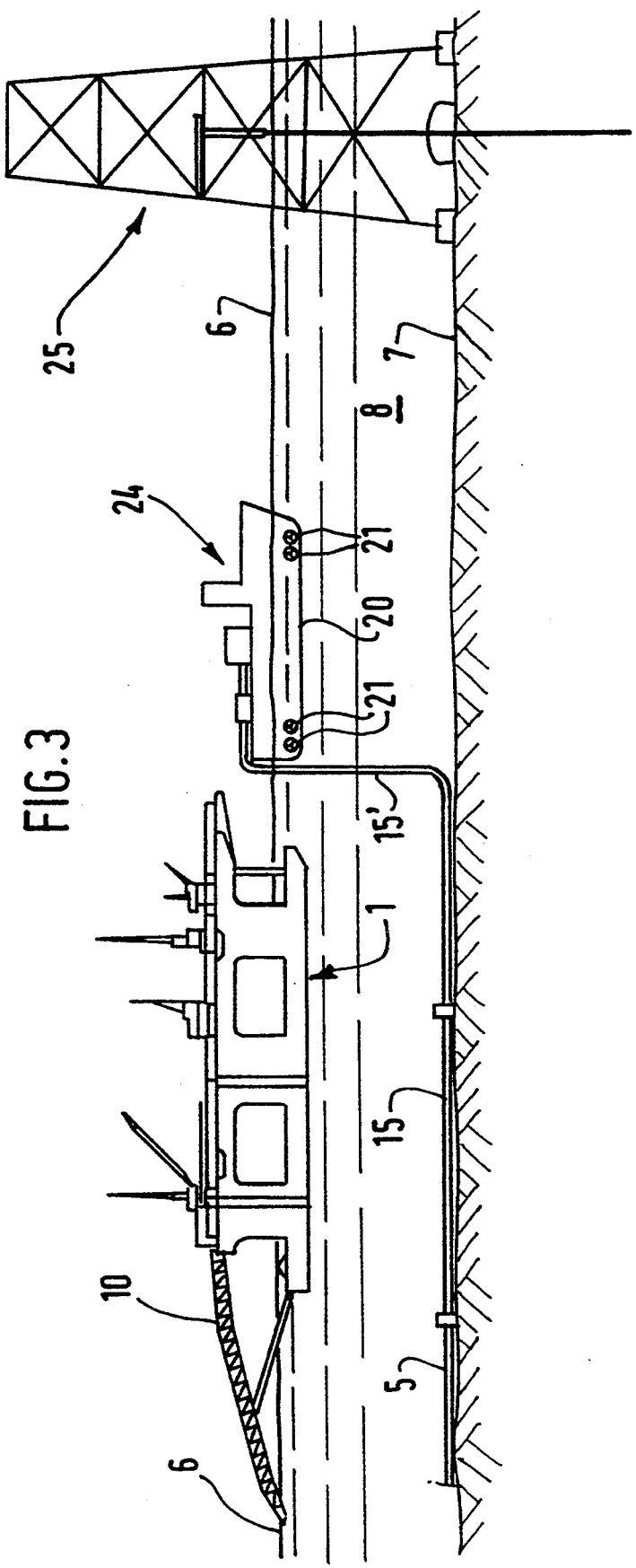

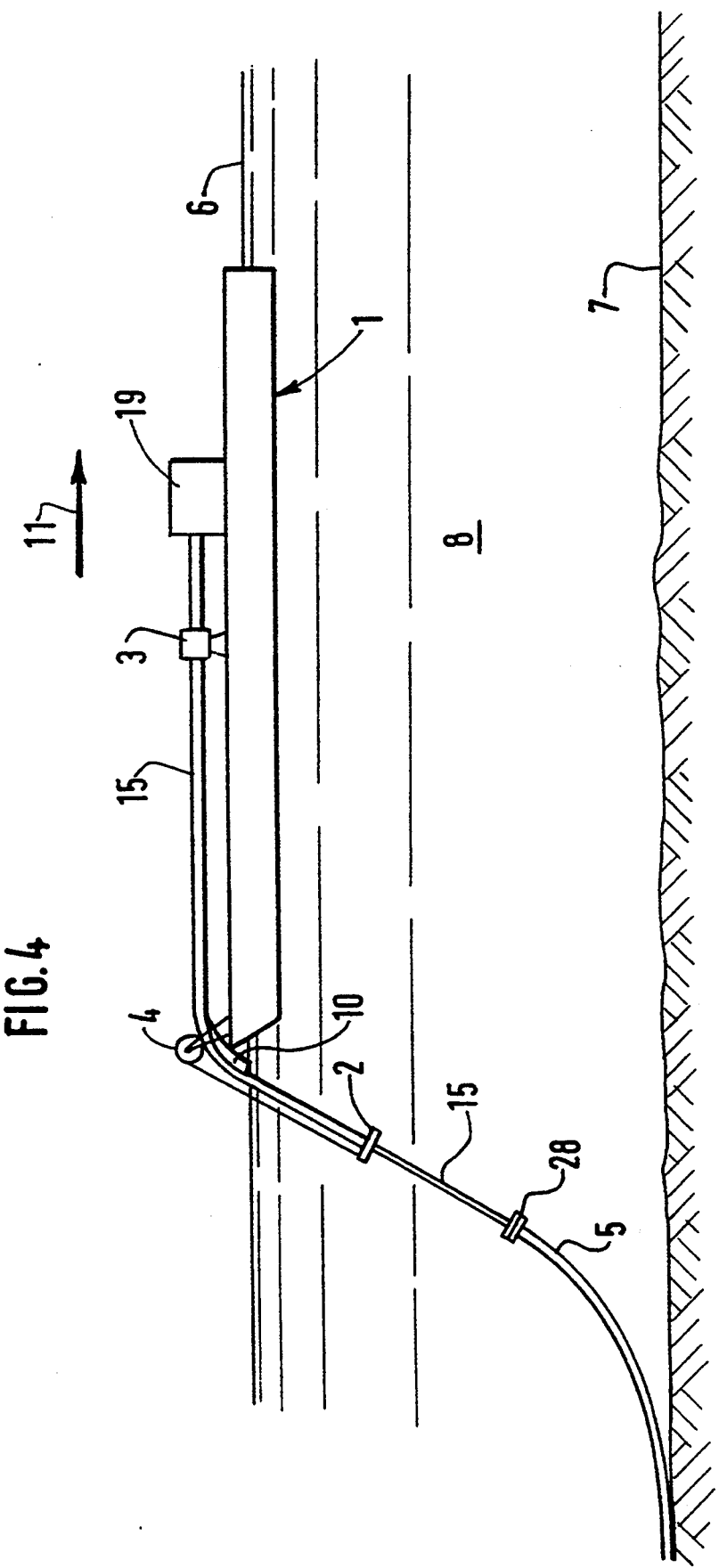

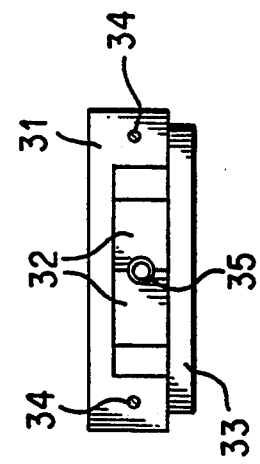
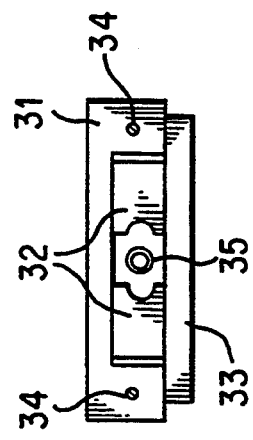
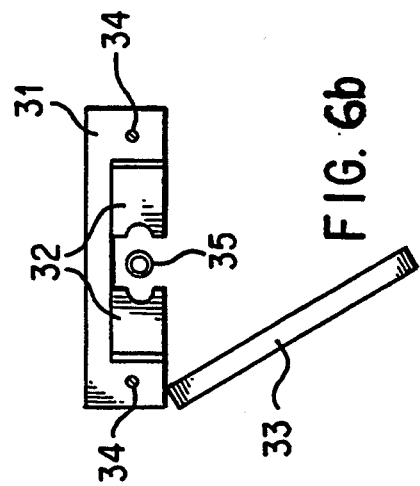
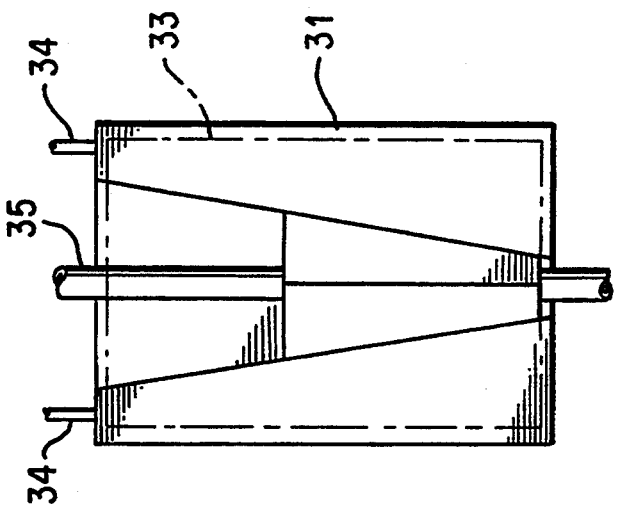
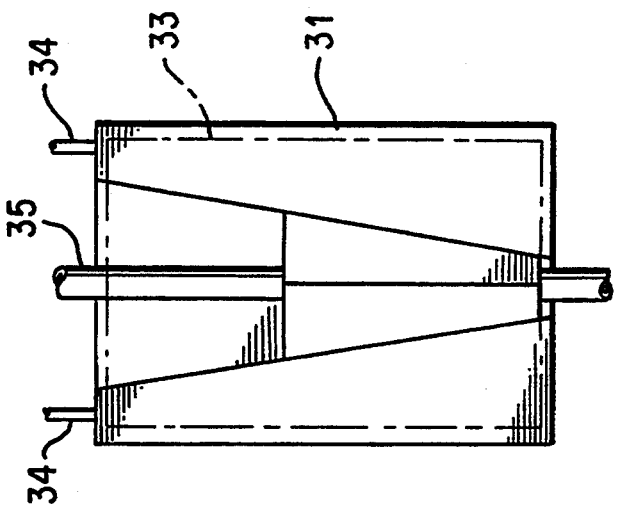
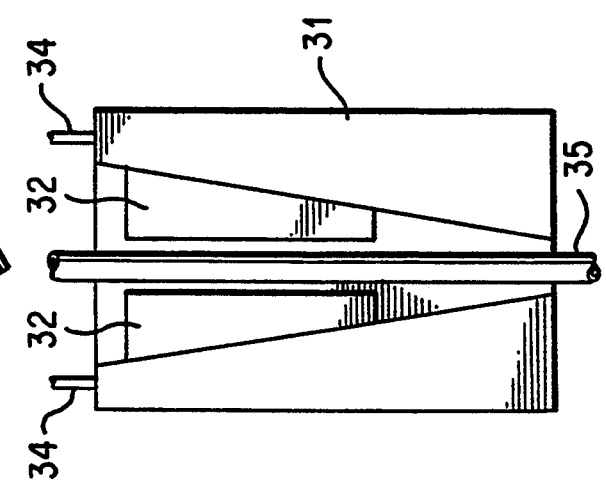

METHOD FOR LAYING TUBULAR CONDUITS

Method for laying tubular conduits

The invention relates to a method for laying a pipeline formed of joined rigid and flexible tubular conduits.

Rigid tubular conduits have the advantage of a relatively low linear cost. They have the disadvantage of being difficult to put into use. In particular, laying them is a long and costly operation. The laying of rigid tubular conduits is carried out using a floating support, in particular barges having low maneuverability. These barges only rarely comprise devices for dynamic positioning. They are therefore forbidden to enter certain areas comprising platforms for drilling or for developing oilfields. A method for laying such rigid tubular conduits is described for example in GB-A-1204715.

Flexible tubular conduits have a higher cost per meter. However, they are extremely quick to put into use. The applicant uses boats having dynamic positioning in order to lay them. These ships do not usually allow rigid tubular conduits to be handled.

The method according to the present invention uses the respective advantages of each type of conduit. The joining of flexible conduits and of rigid tubular conduits may be justified by the presence of an existing network of rigid tubular conduits or by the performance of which the devices for laying flexible conduits are capable.

According to the present invention, it is advantageous to use the equipment for laying rigid tubular conduits and in particular the barges for laying rigid tubular conduits, in order to lay a short length of flexible tubular conduit joined by one end to the terminal end of the rigid tubular conduit. The length of flexible tubular conduit is greater than the depth of the water. Thus, once the end of the rigid tubular conduit rests on the bottom of the water, the second end of the flexible tubular conduit is still available on the barge for laying the rigid tubular conduit. This end is, for example for a subsequent resumption of the laying, transhipped on board a second floating support such as a ship for laying flexible tubular conduits or abandoned on the bottom. The ship for laying flexible tubular conduits continues the laying of the flexible tubular conduit. It allows a quick and safe laying and in particular allows congested sites to be approached, in so far as it is, advantageously, equipped with a device for dynamic positioning.

In one variant of the method according to the present invention, devices which are compact and of low cost are used for carrying out the laying of the flexible tubular conduit from the barge for laying the rigid tubular conduits. Such an item of equipment comprises two pincers the opening and closing of which may be controlled; one pincer is fixed, one pincer is mobile. Such an item of equipment has the advantage of not cluttering the barge which is mainly intended for the laying of rigid tubular conduits. It has the disadvantage of being slow. However, in so far as it is only used to lay short length of the flexible tubular conduit, this device only slightly slows down the operations of laying the tubular conduits. However, it is of course understood that the use of the conventional tensioning means for laying flexible tubular conduits, for example of the type comprising a multi-caterpillar-tracked linear winch, is not beyond the scope of the present invention.

At the end of the laying of the rigid tubular conduit it is necessary to comply with the maximum mechanical stresses which such a conduit can withstand. For example, fixing means are attached to the end of the rigid tubular conduit. These fixing means comprise for example a flange. The fixing means enable the end of the rigid tubular conduit to be solidly fixed with the holding means intended to prevent the rigid tubular conduit from being subjected to bending of too small a radius of curvature. Steel cables for example are used.

The rigid tubular conduit is advantageously inclined for example at an angle between 10° and 30°, typically 20°, at the end of the barge. A supporting device in the form of an inclined ramp called "stinger" is used for this purpose.

Once the flexible tubular conduit is joined to the end of the rigid tubular conduit, the simultaneous lowering of the terminal end of the rigid tubular conduit and of the flexible tubular conduit is carried out. For example, the cables holding the rigid tubular conduit are unwound with winches. During the lowering, the rigid tubular conduit takes up a shape having simple concavity, without any point of inflection, of the catenary type. The flexible tubular conduit, held at one end by its joint with the rigid conduit, itself held by the cables which hold the rigid tubular conduit and having its other end held from the laying ship, bends under its own weight and substantially takes up the shape of a catenary. The horizontal extension of the catenary may be regulated, and in particular reduced, by moving the laying barge. Advantageously, when the end of the rigid tubular conduit reaches the bottom, the cable is disconnected and raised to the surface.

In one embodiment, the flexible tubular conduit itself is used as holding means intended to ensure, that the rigid tubular conduit will not be subjected to a bending of too small a radius of curvature while it is being laid. In such a case, the flexible tubular conduit must be able to resist a tensile stress exerted by the apparent weight in water of the rigid tubular conduit. This stress may for example be supported by conventional flexible tubular conduits of large internal diameter for shallow waters. Specially reinforced flexible tubular conduits may also be used in order to be able to resist very large tensile stresses. For example, the number of tension-resisting reinforcing layers is increased, or the section of the reinforcing wire used is increased. It is of course understood that only the section intended to be laid on the bottom of the rigid tubular conduit needs to be reinforced. It will be possible to carry on laying the flexible tubular conduit with sections of flexible tubular conduit which are not specially reinforced for resisting the tensile stress corresponding to the apparent weight in water of the rigid tubular conduit.

The characteristics of the invention are the subject of claim 1.

The invention will be better understood by means of the following description of the attached figures given as non-limiting examples, in which FIGS. 1a and 1b are diagrams depicting the method according to the present invention using a submerged mobile pincer and a fixed pincer;

FIG. 2 is a diagram depicting the implementation of the method according to the present invention using two submerged pincers;

FIG. 3 is a diagram depicting the laying of flexible tubular conduits joined to a stretch of flexible tubular conduits laid by implementing the method according to the present invention.

FIG. 4 is a diagram depicting an implementation variant of the method according to the present invention in which the flexible tubular conduit acts as a means for holding the rigid tubular conduit.

FIGS. 6a and 6b are top and front views, respectively, of the pincers in a first step of operation.

FIGS. 7a and 7b are top and front views of the pincers in a second step of operation.

FIGS. 8a and 8b are top and front views, respectively, of the pincers in third step of operation.

In FIGS. 1 to 4, the same reference numerals have been used to designate the same elements.

Figure 1A:
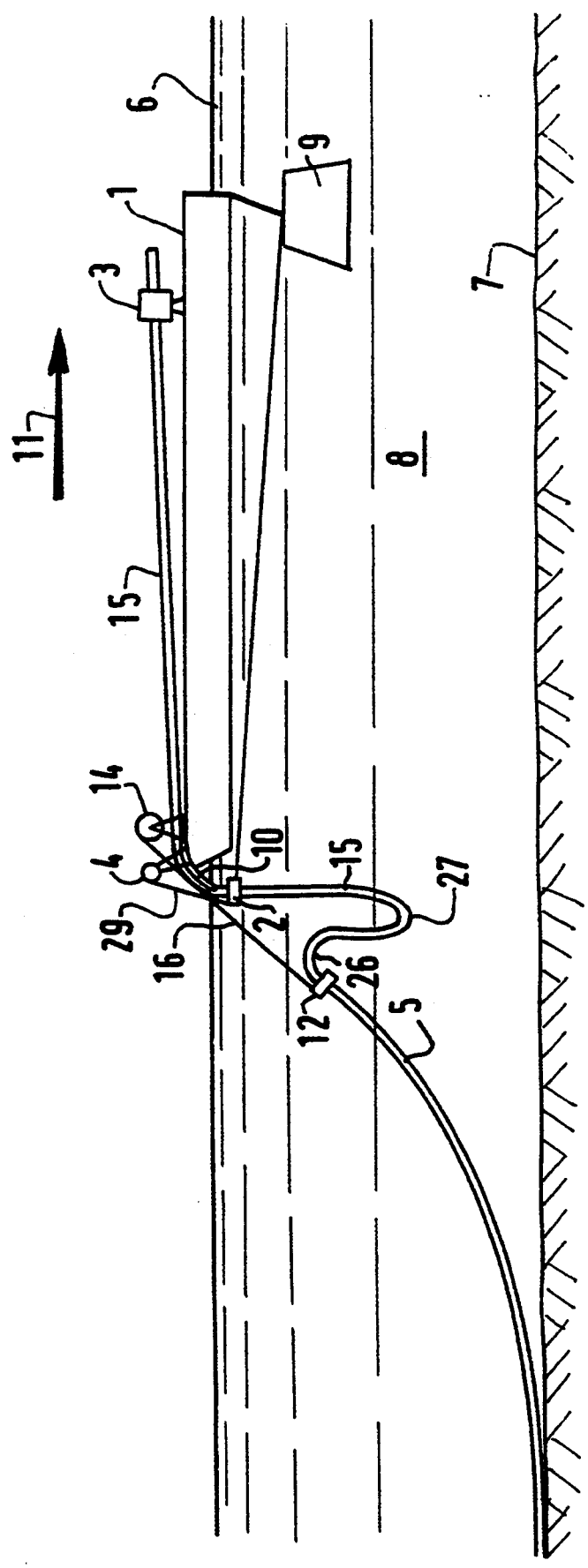

In FIG. 1, an example of laying a pipeline made up of a rigid tubular conduit 5 and of a flexible tubular conduit 15 joined to each other. The length of the flexible tubular conduit 15 is slightly greater than the depth P of the bottom 7. The length of the flexible tubular conduit 15 takes into account the length necessary for this conduit to form a catenary during the laying of the end of the rigid tubular conduit. Once the end of the rigid conduit has been laid on the bottom by means of a first floating support, such as a barge 1 for laying rigid tubular conduits, the laying of flexible tubular conduits 15 will advantageously be carried on by means of a ship specialised in the laying of flexible tubular conduits.

The rigid tubular conduit 5 is held by a holding means 12, for example a clamping pincer connected by a cable 16 to a winch 14. The holding means 12 is placed at the connection between the rigid tubular conduit 5 and the flexible tubular conduit 15. The flexible tubular conduit 15 is held, on the one hand, by the end of the rigid conduit 5, and on the other hand by a mobile pincer 2 and/or by a fixed pincer 3. The flexible tubular conduit 15 substantially takes up the shape of a catenary under the effect of its own weight.

Once the end of the rigid tubular conduit has left the floating support, for example the barge 1, the laying boat or ship, it is possible to "move back" the floating support in the direction opposite to the arrow 11 so as to reduce the horizontal distance of the suspended rigid conduit portion in order to pass from an S-configuration to a simple concave catenary without a point of inflection.

At the joint with the rigid tubular conduit, the flexible tubular conduit has a curve of inverted concavity (swan neck shape).

The catenary formed by the flexible tubular conduit is progressively deformed as the lowering operation takes place. When the flexible tubular conduit touches the bottom, it forms a catenary which is joined tangentially to the end of the rigid tubular conduit.

In FIG. 1a, the mobile pincer 2 has been depicted in its high position. Once the mobile pincer 2 is clamped around the flexible tubular conduit 15, the fixed pincer 3 may be unclamped. The simultaneous lowering of the rigid tubular conduit 5 is carried out by unwinding the cable 16 from the winch 14, and the lowering of the tubular conduit 15 is carried out by unwinding a second cable 29 from the winch 4.

Figure 1B:
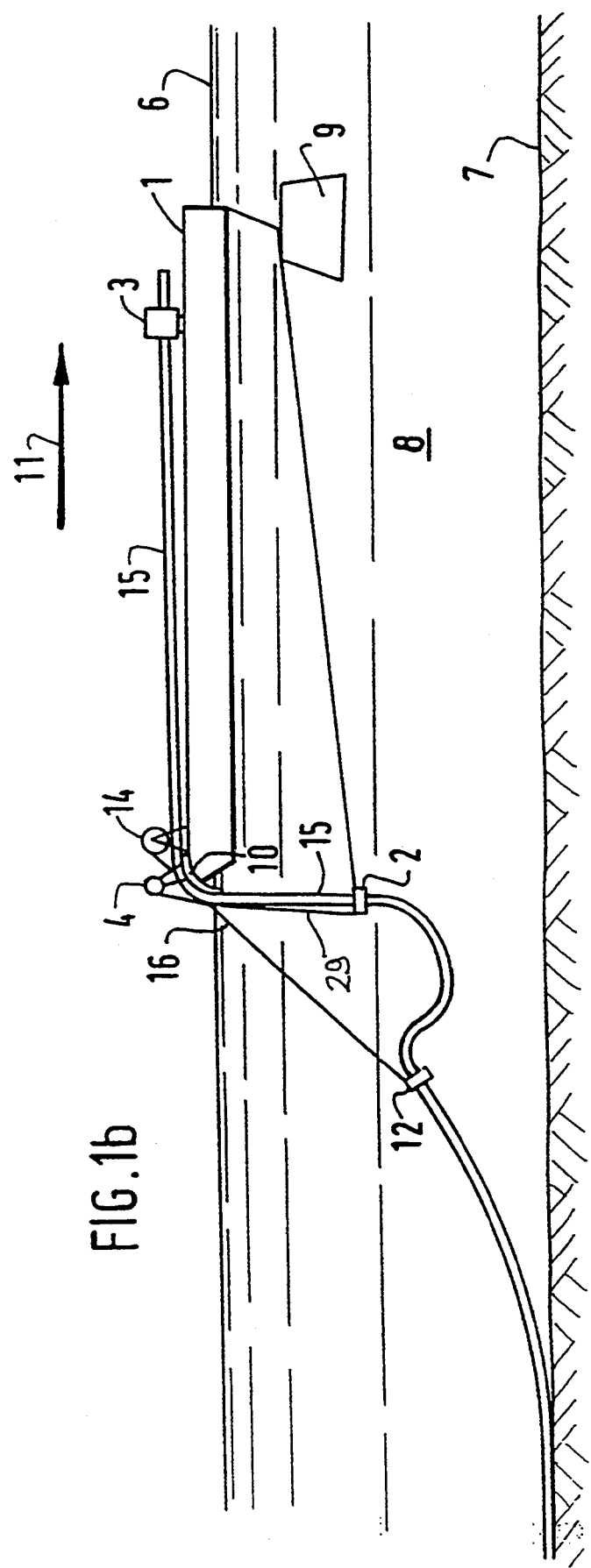

In FIG. 1b, the pincer 2 has been depicted in its low position. At this point, the fixed pincer 3 is clamped around the flexible tubular conduit 15 and the mobile pincer 2 is raised. In the example depicted in FIG. 1, the fixed pincer 3 is located near the bow (according to the direction of the arrow 11) of the boat 1. In practice, this is not at all necessary. As the flexible tubular conduit 15 is progressively lowered, it is unwound, for example by storage means of the "basket" or "cable drum" type (not shown in FIG. 1). When the mobile pincer 2 has reached its low position, the fixed pincer 3 is clamped. The pincer 2 is then opened and by winding the cable 29 onto the winch 4, the mobile pincer 2 is raised. The beginning of the cycle depicted in FIG. 1a is arrived at once again.

Advantageously, when the pincer 12 has reached the bottom 7, it is released and raised by the winch 14. The pincers 2 and 3 are illustrated in FIGS. 5-8. The pincers 2 and 3 each include a main frame 31, two movable key-shaped jaws 32, and door 33, and maneuvering cables or hydraulic jacks 34. A flexible conduit 35 is gripped by the jaws 32. Referring to FIG. 6, the jaws 32 are in an open position allowing the pincer to be placed around a conduit 35. In FIG. 7, the door 33 is closed and the jaws 32 remain in their open position allowing translation of the pincer along the conduit 35. In FIG. 8, the jaws 32 have closed about the conduit 35. The door 33 is not shown in FIG. 6a since the door is open, however, the door 33 is shown in dotted line and FIG. 7a and 8a.

In FIG. 2, the implementation of the method according to the present invention using a plurality of pincers placed on the deck of the barge 1 may be seen. In the example depicted, two pincers, one being fixed 3, the other mobile 2, fixed on the deck of the barge 1, let go alternately, enable the flexible tubular conduit 15 to be laid. Simultaneously, the unwinding of the cable 16 from the winch 14 enables the rigid tubular conduit 5 to be laid. In the example depicted in FIG. 2, the flexible tubular conduit 15 is unwound from a storage means 19.

In one variant of the method according to the invention, the second end of the flexible tubular conduit 15 is abandoned on the bottom. Advantageously, such an end abandoned on the bottom will comprise means facilitating its recovery such as for example connection devices and/or locating means. The locating means will comprise for example a sonar beacon. For example, a passive sonar beacon will be used for abandonments of long duration, and an active sonar beacon will be used for abandonments of short duration.

In one particularly advantageous variant of the method according to the invention, once the end of the rigid tubular conduit rests on the bottom, the second end of the flexible tubular conduit 15 lying ready on the floating support 1 is transhipped onto a second laying support such as a ship specialized in the laying of flexible tubular conduits, for example as depicted in FIG. 3, a quick-laying ship 24 comprising means 21 for dynamic positioning. The continuation of the operations of laying flexible tubular conduits will be carried out using this ship (as depicted in FIG. 3). In order to tranship the flexible tubular conduit from the first floating support 1, for example from a barge, to a second floating support, for example a ship 24, a steel cable is first advantageously passed between the barge 1 and the ship 24, the end of the flexible tubular conduit to be transhipped being solidly fixed to the end of this cable. This solid fixing is carried out for example by means of a flange. A traction on the cable, for example by means of a winch installed on the ship 24, enables the end of the flexible tubular conduit to be brought on board the second floating support.

Such a ship will be able to lay a great length of flexible tubular conduit 15' joined to the tubular conduit 15 laid by the barge 1 and/or approach a drilling or production platform 25 without there being any danger of colliding with this platform.

In FIG. 4, an example of implementation of a laying method according to the present invention may be seen in which the flexible tubular conduit 15 holds the rigid tubular conduit 5. The conduits 5 and 15 are solidly fixed to each other by a connection means 28, for example comprising flanges. For example a first flange is welded to the end of the rigid conduit 5. A second flange is fixed to the end of the joining piece, not shown, fixed to the flexible tubular conduit 15.

We claim:

1. A method for laying a pipeline formed of joined flexible tubular conduits and rigid tubular conduits, onto a bottom located at a depth P, in particular an ocean bed, which comprises the steps consisting of:

loading a length, greater than the depth P, of flexible tubular conduit onto a first floating support;

laying a length of rigid tubular conduit (5), the terminal end of which is held by said first floating support, onto the bottom, from a first floating support (1);

connecting a first end of said flexible tubular conduit (15) having a length greater than the depth of the water P to the free terminal end of said rigid tubular conduit (5);

simultaneously lowering the terminal end of the rigid tubular conduit (5) and the flexible tubular conduit (15);

continuing the lowering until the first end of the flexible tubular conduit connected to the terminal end of the rigid tubular conduit is located on the bottom (7) and whereat the second end of the flexible conduit (15) is still located on board the first floating support (1);

transferring said second end of the flexible tubular conduit (15) onto a second floating support (24), to connect the end of another flexible tubular conduit (15') to said second end of the flexible tubular conduit (15) and laying the section of pipeline comprising said flexible tubular conduits (15, 15') onto the bottom (7).

2. The method as claimed in claim 1, wherein the step consisting of transferring said second end of the flexible tubular conduit (15) includes the transhipping of said end from the first floating support (1) to the second floating support (24).

3. The method as claimed in claim 1, wherein the step consisting of transferring said second end of the flexible tubular conduit (15) is implemented after a step consisting in abandoning the flexible tubular conduit (15) from said first floating support, said transfer step comprising a step consisting in recovering, by means of the second floating support (24), the flexible tubular conduit (15) abandoned by said first floating support (1).

4. The method as claimed in claim 1, wherein said first floating support (1) is a barge for laying rigid tubular conduits (5).

5. The method as claimed in claim 4, wherein the barge for laying rigid tubular conduits (5) is a barge for S-shaped laying comprising a ramp (10) for supporting the rigid tubular conduit (5).

6. The method as claimed in claim 1, wherein said second floating support (24) is a specialized ship for laying flexible tubular conduits.

7. The method as claimed in claim 1, which comprises a step consisting of fixing holding means, such as a traction cable (16), to the end of the rigid tubular conduits (5) via fixing means (12), the holding means being operated from the first floating support (1).

8. The method as claimed in claim 1, wherein the flexible tubular conduit (15) holds the rigid tubular conduit (5) during the laying operation.

* * * * *

UNITED STATES PATENT AND TRADEMARK OFFICE
CERTIFICATE OF CORRECTION

PATENT NO. : 5,380,129
DATED : January 10, 1995
INVENTOR(S) : Maloberti et al.

Dear Sir:

It is certified that error appears in the above-indentified patent and that said Letters Patent is hereby corrected as shown below:

Column 3, line 5, after "diagram of" delete "the" and insert --an embodiment of a--.

Figure 5:
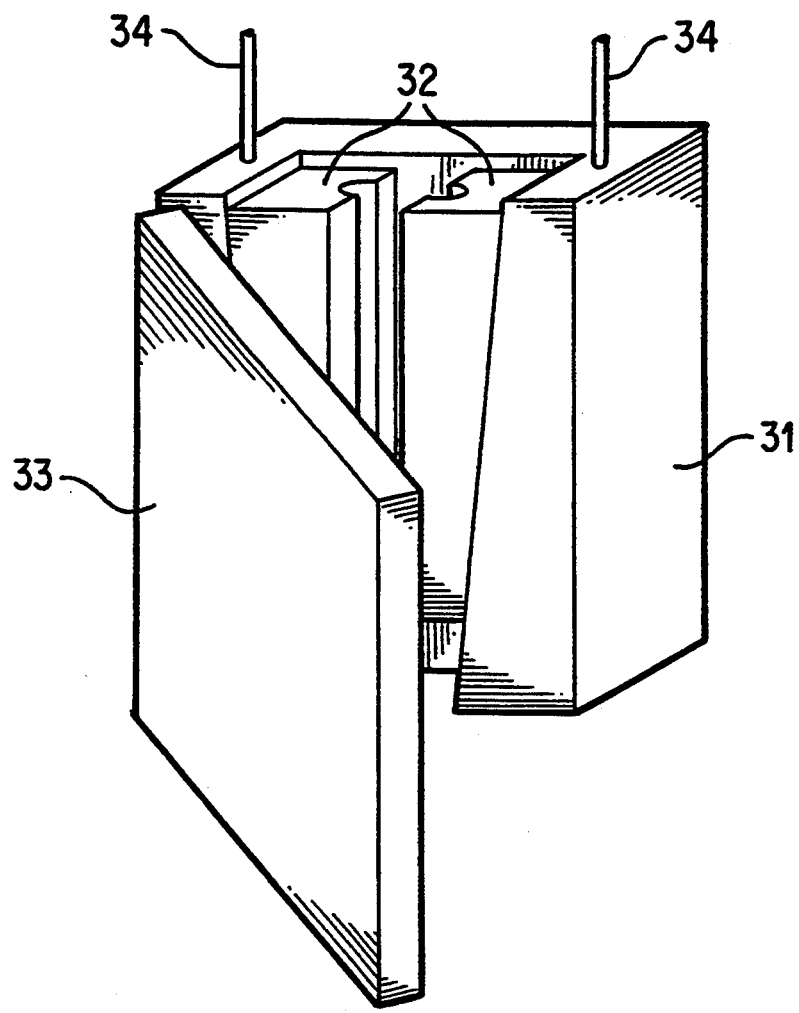
FIG. 5 is a perspective diagram of the pincer for holding the conduits.

Upon reviewing the present patent, Applicant noted that a change to a reference to the Figures had inadvertently been overlooked, and consequently the present Certificate of Correction is being filed to make appropriate reference to Figure 5. This correction is of minor character, and does not affect the scope of the claims.

Pursuant to 37 CFR 1.20(a), enclosed herewith is a check for $100.00 for the Certificate of Correction. If any issues remain which can be solved by a personal or telephone interview, please contact the undersigned attorney at the local telephone number listed below.

Signed and Sealed this

Thirtieth Day of May, 1995

Attest:

BRUCE LEHMAN

*Attesting Officer*    *Commissioner of Patents and Trademarks*